US011434805B2

(12) United States Patent
Bell et al.

(10) Patent No.: US 11,434,805 B2
(45) Date of Patent: *Sep. 6, 2022

(54) FLAMELESS FLUID HEATER

(71) Applicant: ConleyMax Inc., Calgary (CA)

(72) Inventors: Patrick G. Bell, Calgary (CA);
William N. Beckie, Calgary (CA)

(73) Assignee: ConleyMax Inc., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/024,938

(22) Filed: Sep. 18, 2020

(65) Prior Publication Data

US 2021/0003059 A1    Jan. 7, 2021

Related U.S. Application Data

(63) Continuation of application No. 15/966,451, filed on Apr. 30, 2018, now Pat. No. 10,844,766, which is a continuation of application No. 13/835,617, filed on Mar. 15, 2013, now Pat. No. 9,982,585.

(51) Int. Cl.
| | |
|---|---|
| *F22B 3/06* | (2006.01) |
| *F22D 7/10* | (2006.01) |
| *F01N 5/02* | (2006.01) |
| *F24H 1/00* | (2022.01) |

(52) U.S. Cl.
CPC ............... *F01N 5/02* (2013.01); *F24H 1/00* (2013.01); *F01N 2240/02* (2013.01); *F24D 2200/18* (2013.01); *F24D 2200/26* (2013.01); *F24D 2200/30* (2013.01); *Y02T 10/12* (2013.01); *Y10T 137/0391* (2015.04)

(58) Field of Classification Search
CPC .......... F01N 5/02; F01N 2240/02; F24H 1/00; F24D 2200/18; F24D 2200/26; F24D 2200/30; F22B 3/06; F22B 9/02; F22B 35/04; F22B 35/08
See application file for complete search history.

(56) References Cited

U.S. PATENT DOCUMENTS

| | | | |
|---|---|---|---|
| 4,132,384 | A | 1/1979 | Berg |
| 4,264,826 | A | 4/1981 | Ullmann |
| 4,385,594 | A | 5/1983 | Hauser |
| 4,680,975 | A | 7/1987 | Dodt |
| 4,881,495 | A | 11/1989 | Tornare et al. |

(Continued)

FOREIGN PATENT DOCUMENTS

| | | |
|---|---|---|
| CA | 2741507 A1 | 9/2012 |
| CA | 2811829 A1 | 7/2014 |
| JP | 10-175419 A | 6/1998 |

OTHER PUBLICATIONS

USPTO Office Action for U.S. Appl. No. 13/834,942 dated Sep. 20, 2017.

(Continued)

*Primary Examiner* — Gregory A Wilson
(74) *Attorney, Agent, or Firm* — HEA Law PLLC; Darrin A. Auito

(57) ABSTRACT

Heat from a rotating prime mover(s) driving a fluid shear pump, heat from the prime mover and any exhaust heat generated by the prime mover is collected. The heat energy collected from all of these sources is transmitted through heat exchangers to a fluid where heat energy is desired. This fluid heating process is performed in the absence of an open flame.

20 Claims, 1 Drawing Sheet

(56) References Cited

U.S. PATENT DOCUMENTS

| | | | |
|---|---|---|---|
| 5,098,036 | A | 3/1992 | Brigham et al. |
| 5,190,249 | A | 3/1993 | Whitmire et al. |
| 5,222,696 | A | 6/1993 | Brigham et al. |
| 5,709,201 | A | 1/1998 | Puett, Jr. |
| 6,761,135 | B1 | 7/2004 | Beckfold |
| 6,883,467 | B2 | 4/2005 | Holden |
| 7,337,828 | B2 | 3/2008 | Lange |
| 7,424,916 | B2 | 9/2008 | Foster et al. |
| 7,614,367 | B1 | 11/2009 | Frick |
| 7,637,232 | B2 | 12/2009 | Foster |
| 7,766,077 | B2 | 8/2010 | Masters et al. |
| 7,866,380 | B2 | 1/2011 | Masters et al. |
| 8,291,868 | B2 | 10/2012 | Whallon |
| 8,371,251 | B2 | 2/2013 | Frick |
| 8,464,963 | B2 | 6/2013 | Roth et al. |
| 8,469,283 | B2 | 6/2013 | Sanger et al. |
| 9,228,760 | B2 | 1/2016 | Welle et al. |
| 9,347,303 | B2 | 5/2016 | Horst et al. |
| 10,151,539 | B2 * | 12/2018 | Kamps .................. F24H 1/06 |
| 2004/0144200 | A1 | 7/2004 | Giordano et al. |
| 2005/0121532 | A1 | 6/2005 | Reale et al. |
| 2006/0185621 | A1 | 8/2006 | Foster et al. |
| 2006/0260788 | A1 | 11/2006 | Masters et al. |
| 2007/0261823 | A1 | 11/2007 | Masters et al. |
| 2008/0185453 | A1 | 8/2008 | Sanger et al. |
| 2010/0000508 | A1 | 1/2010 | Chandler |
| 2010/0006668 | A1 | 1/2010 | Alexander |
| 2010/0139577 | A1 | 6/2010 | Whallon |
| 2010/0192875 | A1 | 8/2010 | Frick |
| 2011/0005757 | A1 | 1/2011 | Herbert |
| 2011/0036418 | A1 | 2/2011 | Hendy |
| 2011/0079561 | A1 | 4/2011 | Masters et al. |
| 2011/0120427 | A1 | 5/2011 | Andersson |
| 2011/0185713 | A1 | 8/2011 | Koopmann et al. |
| 2011/0297353 | A1 | 12/2011 | Stegeman |
| 2012/0048717 | A1 | 3/2012 | Frick |
| 2012/0174987 | A1 | 7/2012 | Crawford |
| 2013/0270352 | A1 | 10/2013 | Roth et al. |
| 2014/0174691 | A1 | 6/2014 | Kamps |

OTHER PUBLICATIONS

USPTO Office Action for U.S. Appl. No. 14/037,123 dated Dec. 18, 2017.
USPTO Office Action for U.S. Appl. No. 13/834,942 dated Jan. 11, 2017.
USPTO Office Action for U.S. Appl. No. 14/037,123 dated Jan. 26, 2017.
Written Opinion dated Dec. 9, 2014, issued in International Application No. PCT/CA2014/050919 (5 pages).
International Search Report dated Dec. 9, 2014, issued in International Application No. PCT/CA2014/050919 (3 pages).
Office Action dated Aug. 19, 2013, issued in Canadian Patent App. No. 2,815,986 (2 pages).
Office Action dated Aug. 13, 2014, issued in Canadian Patent App. No. 2,815,986 (2 pages).
Office Action dated Feb. 26, 2015, issued in Canadian App. No. 2,828,522 (3 pages).
Notification Concerning Transmittal of International Preliminary Report on Patentability (Chapter 1 of the PCT) dated Dec. 24, 2015, issued in counterpart International App. No. PCT/CA2014/050285 (1 page).
Extended Search Report dated Nov. 4, 2016, issued in counterpart to European App. No. 14762281.5 (8 pages).
Office Action dated Jun. 17, 2016, mailed in U.S. Pat. U.S. Appl. No. 14/037,123 (53 pages).
Notification of Transmittal of Translation of the International Preliminary Amendment Report on Patentability (Forms PCT/IB/326) of International App. No. PCT/CA2014/050919, dated Mar. 29, 2016 with Form PCT/IB/237 and PCT/IB/373 (7 pages).
International Search Report of PCT/CA2014/050286, dated Jun. 9, 2014.
Written Opinion dated Jun. 9, 2014, issued in corresponding International App. No. PCT/CA2014/050286.
Office Action dated Jan. 23, 2014, issued in Canadian Pat. App. No. 2,828,522 (2 pages).

* cited by examiner

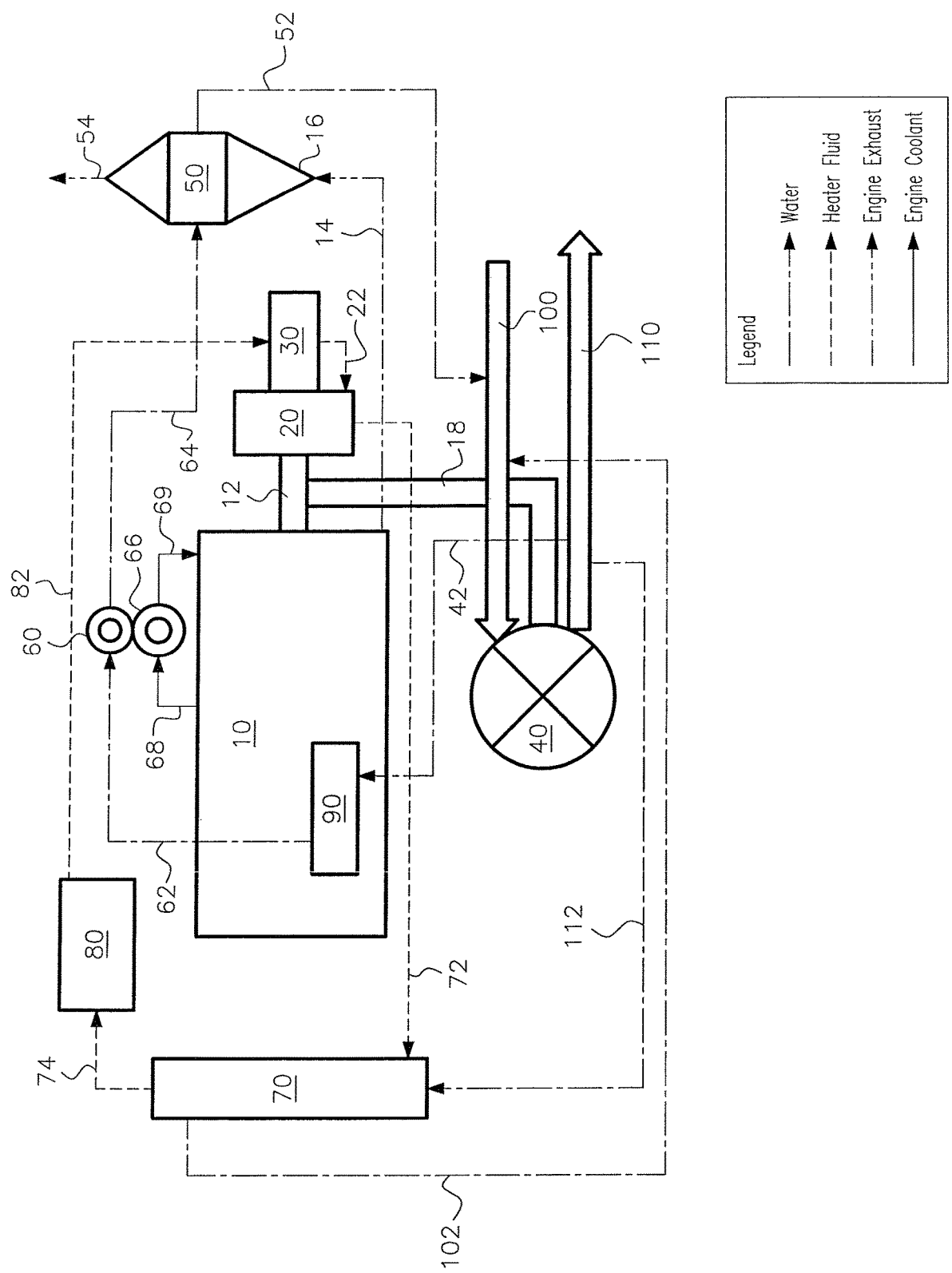

FLAMELESS FLUID HEATER

CROSS-REFERENCE TO RELATED APPLICATIONS

This application claims priority to and is a continuation application of pending U.S. application Ser. No. 15/966,451 filed on Apr. 30, 2018, which claims priority to and is a continuation application of U.S. application Ser. No. 13/835,617, filed Mar. 15, 2013 (now U.S. Pat. No. 9,982,585). The contents of the above documents is incorporated herein by reference in its entirety.

FIELD OF THE INVENTION

The present invention relates to processes used to heat and pump industrial fluids, where the heating process does not require an open flame.

BACKGROUND OF THE INVENTION

Industrial applications may require large volumes of heated fluid, primarily water, but not excluding other fluids such as hydrocarbons or caustic solutions. Although reference is made to all of these fluids, in order to identify fluids separately, these fluids will be identified as being water.

Specific environments may require that no open flame be present. This most commonly occurs in the energy industry. The present invention was created to heat fluids in these types of environments.

Oilfield fracture stimulation treatments require large volumes of water. Water is warmed to allow fluid to gel and carry sand into a reservoir to be stimulated. Common practise has been to transport water, usually by truck, to several tanks located at a site of a recently drilled well. This water is heated by open flamed trucks which utilize diesel or propane fired burners. These burners are very inefficient, utilizing excessive amounts of fuel. They are also extremely hazardous, and can lead to fires, severe burns, and even fatalities.

The present invention allows an opportunity to eliminate the trucking of water, and move warm water via temporary pipelines, typically agricultural irrigation pipes, to fill the subject tanks. This water is heated as it is pumped into the pipelines, preventing freezing issues in cold weather. Once the tanks are filled, the heater of the present invention is moved to the tank site, and further heats the water, or any other fluid contained in the tanks, to the desired temperature. The heating process is efficient and safe, making the best use of fuel in a flameless environment.

SUMMARY OF THE INVENTION

The present invention consists of a number of major components which are connected in such a way that the process provides efficient, flameless heat. The components are generally trailer mounted, but may also be truck or skid mounted.

The largest component is the prime mover. The prime mover is most often a diesel engine, gasoline engine or natural gas engine. An electric drive may also be used depending on the environmental considerations.

Connected directly to the drive shaft of the prime mover is a dynamic heater such as a fluid shear pump. This component utilizes the majority of the power available from the prime mover, and converts this energy into heat. The pump shears a heater fluid such as oil. This oil is contained in a separate system, and transfers its heat energy to the water through a liquid to liquid heat exchanger.

Also connected to the drive of the prime mover is a main pump to move the water through the system. This pump is typically a centrifugal pump, usually self-priming to allow movement of water from a lower elevation (lake, pond, or river) into the heating unit, and out to the pipeline or tank. The pump also provides the flow of cooling water to allow the engine to operate properly, while heating the water at the same time.

The remaining major components to the system are heat exchangers.

A first heat exchanger is a liquid to liquid heat exchanger, mentioned above, that transfers heat from the heater fluid, generated by the fluid shear pump, to the water.

A second heat exchanger is also a liquid to liquid heat exchanger, which transfers heat generated in the engine coolant to the water. This fluid is pumped by the main pump, as mentioned above.

A third heat exchanger is an air to liquid heat exchanger which transfers heat generated in the turbocharger intercooler on a diesel prime mover engine to the water.

A fourth heat exchanger is also an air to liquid heat exchanger, which transfers the heat generated in the engine exhaust of the prime mover to the water.

Other system components include a fuel tank to operate the prime mover engine, a heater fluid reservoir, a trailer to house the components, and a control system to maintain operation of the system and alarm in the event of a mechanical failure.

These and other objects of the invention, as well as many of the intended advantages thereof, will become more readily apparent when reference is made to the following description taken in conjunction with the accompanying drawings.

BRIEF DESCRIPTION OF THE DRAWINGS

The following drawings illustrate examples of various components of the invention disclosed herein, and are for illustrative purposes only. Other embodiments that are substantially similar can use other components that have a different appearance.

The FIGURE schematically illustrates the flow of heater fluid and the flow of water for exchange of heat from four sources of heat.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Reference will now be made to the FIGURE for a more detailed description of the flameless heat generation process. Each component will be described in detail, followed by an overview of the heat generation process.

The largest component of the flameless process is the prime mover 10. The prime mover can be any type of engine, fueled by a variety of fuels such as diesel, propane or natural gas. It can also be an electrical engine in certain applications.

The fuel driven engine is typically set up like a marine engine, which will have a water cooled intercooler 90 to cool and increase the density of the air travelling from a compressor side of a turbocharger of the engine 10 to an engine intake. The engine will also have water/engine coolant heat exchanger portions 60, 66 to keep the engine running within its ideal temperature range. Typical marine engines have a built in water pump to move water through the intercooler and the heat exchanger. The prototype model of the heat generation process utilized such a pump. This pump was able to be removed for the second generation units and the discharge of the main water pump 40 was utilized for this purpose.

Attached to the prime mover 10 is a dynamic heater, such as a fluid shear pump 20. The majority of the engine horsepower is used to shear a heating fluid in the fluid shear pump 20. The heating fluid can be any fluid that is practical to be used in an oilfield environment. The fluid should be environmentally friendly as well as non-combustible and be commonly used in oilfield applications. Examples of heating fluids used in this application include oil and glycol.

The fluid shear pump 20 can use either metal plates moving across each other, spinning discs or pumping fluids through orifices to create fluid shear forces large enough to generate heat in the heating fluid. The majority of the power generated by the engine is used for the purpose of shearing fluid to generate heat. The fluid shear pump 20 is bolted directly to the engine 10 and is powered by the output shaft 12 of the engine.

Between the engine 10 and fluid shear pump 20 is a torsional vibration dampener (not shown), which is used to smooth out the vibrations created by the prime mover. The use of a torsional vibration dampener extends the life of the output shaft 12 and the fluid shear pump 20.

Bolted directly to the fluid shear pump 20 is heater fluid pump 30, which is either a hydraulic oil pump or a glycol pump. This pump 30 is typically driven by the prime mover through the fluid shear pump shaft 20. The purpose of this pump is to move the heating fluid through the various components.

Water pump 40 is a self-priming centrifugal trash pump capable of pumping fluids to and from various elevations. Pump 40 is driven by shaft 18 off of drive shaft 12. It must be capable of pumping fluids containing contaminants such as sand, silt, gravel, and fine material found in rivers and creeks. It must also be drainable for winter service.

Exhaust heat exchanger 50 must be constructed of stainless steel or similar non-corrosive material. The prime mover exhaust 14 enters the bottom 16 of the heat exchanger 50 where the exhaust is directed upward to heat tube bundles containing water within heat exchanger 50. Typically the exhaust gases enter the exhaust heat exchanger at temperatures of up to 700° F. (400° C.) and exit from pipe 54 at 70° F. (25° C.).

Engine coolant is pumped by a pump portion of engine coolant/water heat exchanger portions 60, 66 to circulate engine coolant through pipes 68 and 69. Water is pumped through water heat exchanger portion 60 to draw off heat from circulating coolant passing through pipes 68 and 69. This keeps the engine coolant within the operating range of the engine. This heat exchanger is built of marine grade material.

Heater fluid/water heat exchanger 70 is a heat exchanger that is used to transfer heat from the heated fluid of shear pump 20 to the water. It is also specified to be of marine grade material.

Heater fluid reservoir 80 is a reservoir tank that is used to hold the heating fluid. It is typically 50 gallons (200 litres) in size and has an attached filter for filtering the heating fluid.

Water inlet 100 and water outlet 110 are used to transfer the water into and out of the trash pump 40. They either have cam lock or hammer unions to attach to flexible hoses.

The Heating Process

The heating process consists of collecting the heat from four different components and transferring it to the water. The four heat source components are the fluid heater pump 20, engine coolant/water heat exchanger portions 60, 66, the engine water/air intercooler 90 and the exhaust heat exchanger 50.

The heating process begins by starting the prime mover 10. At this time the pump 40 will start pumping and begin to fill with water. Air will be purged from the system using a series of bleeder valves.

The water enters the system through the inlet pipe 100. Water enters the trash pump 40, which is used to pump water to the various components as well as to the outlet pipe 110. From the outlet pipe 110, water is pumped along pipeline 42 to water/air intercooler 90, and then on to the engine coolant heat exchanger portion 60 by pipeline 62, through the exhaust heat exchanger 50 by pipeline 64 and then back to the water inlet pipe 100 by pipeline 52.

In the prototype model, an impeller type pump attached directly to and run by the prime mover was used for this function. The second generation machine utilized the outlet (high pressure) side (outlet 110) of the centrifugal pump 40 to do this function more simply and efficiently by eliminating a high maintenance pump. The centrifugal pump 40 is also used to pump water from the high pressure side (outlet 110) of the pump 40 by pipeline 112 to pump water to heater fluid/water heat exchanger 70 and then back to the inlet side of the pump by pipeline 102.

Once the prime mover 10 has warmed up and the air has been purged from the system, the prime mover 10 is throttled up to maximum power and rpm. At this time the fluid heat pump 20 begins to generate heat. This heat is transferred to the heater fluid, which is pumped from the reservoir 80, through the heater fluid pump 30 by pipeline 82, through the fluid heat pump 20 by pipeline 22 to pick up the heat generated by pump 20, and through the heat exchanger 70 by pipeline 72. It is at the heat exchanger 70 that heat is transferred from the heater fluid to the water which is returned to the inlet by pipeline 102.

Once the fluid has passed through the heat exchanger 70 and the heat has been removed from the heater fluid, the heater fluid is returned to the heater fluid reservoir 80 by the pipeline 74, where it is stored and filtered until it is pumped back through this cycle. The heater fluid is in a closed system that continually follows this route. This is a first source of heat.

From the outlet 110 of the centrifugal pump 40, the water is pumped to the engine intercooler by pipeline 42. The purpose of the intercooler is to cool the air coming from the compressor side of the turbocharger of the engine 10. As the air is passed through the turbocharger the air is heated. By passing the air through the intercooler 90, this air is cooled by the water in the intercooler 90 from the pipeline 42. This results in the air being cooled as well as the water being heated at the same time. This is the second source of heat.

The water continues from the intercooler 90 to the engine coolant/water heat exchanger portion 60 by pipeline 62. The heat exchanger portion 60 allows the heat from the hot coolant passing from pipe 68 to heat exchanger portion 66 to be transferred to the water at heat exchanger portion 60. Sufficient volume of water is pumped to keep the engine coolant operating within its specified temperature range. This is the third source of heat.

After exiting the engine heat exchanger portion 60, the water is pumped to the exhaust heat exchanger 50 by pipeline 64. In this exchanger, the hot exhaust from the engine from pipeline 14 which can be at 700° F. (400° C.) is allowed to flow across a series of pipes that the water flows through in the engine exhaust heat exchanger 50. This exchanger is sized so that the exhaust output temperature from pipe 54 is at approximately 70° F. (20°-25° C.). From the outlet of this heat exchanger 50 the water is pumped back to the inlet 100 of the trash pump 40 by pipeline 52, where the heated water mixes with colder water entering the system. This is the fourth source of heat.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

The invention claimed is:

1. A flameless fluid heater system for heating fluids, said flameless fluid heater system comprising:
    a prime mover, said prime mover comprising engine coolant, intercooler, and engine exhaust;
    a closed heater fluid loop, said closed heater fluid loop comprising a heater fluid pump and a dynamic heater for heating heater fluid, said dynamic heater driven by the prime mover through an output shaft of the prime mover;
    a main pump for transfer of water, said main pump driven by the prime mover through pump shaft driven by the output shaft of the prime mover;
    a first heat exchanger transferring heat from the heater fluid to the water;
    a second heat exchanger transferring heat from the engine coolant to the water;
    a third heat exchanger transferring heat from the intercooler to the water; and
    a fourth heat exchanger transferring heat from the engine exhaust to the water,
    wherein the heater fluid is at least one of oil and glycol,
    wherein the main pump is configured to pump the water from an outlet of the main pump by a first pipeline to pump water to the first heat exchanger and then back to an inlet side of the main pump by a second pipeline, and
    wherein the outlet of the main pump is a high-pressure side of the main pump.

2. The flameless fluid heater system according to claim 1, wherein the main pump is a self-priming centrifugal pump.

3. The flameless fluid heater system according to claim 2, wherein the centrifugal pump is configured to be drainable and to pump fluids containing contaminants to and from various elevations within said system.

4. The flameless fluid heater system according to claim 1, wherein the heater fluid heated in the dynamic heater is transferred to the first heat exchanger and returned to the heater fluid pump.

5. The flameless fluid heater system according to claim 4, wherein the heater fluid is transferred from the heater fluid pump to the dynamic heater.

6. The flameless fluid heater system according to claim 1, wherein the water is transferred from the outlet of the main pump to the third heat exchanger, then to the second heat exchanger, then to the fourth heat exchanger and retuned to the inlet of the main pump.

7. The flameless fluid heater system according to claim 6, wherein the water from the outlet of the main pump is transferred to the first heat exchanger and returned to the inlet of the main pump.

8. The flameless fluid heater system according to claim 7, wherein the heater fluid is transferred from the heater fluid pump to the dynamic heater.

9. The flameless fluid heater system according to claim 8, wherein the heater fluid heated in the dynamic heater is transferred to the first heat exchanger and returned to the heater fluid pump.

10. The flameless fluid heater system according to claim 1, wherein air is purged from said system using a series of bleeder valves.

11. The flameless fluid heater system according to claim 1, wherein a heater fluid reservoir provides the heater fluid to the heater fluid pump.

12. The flameless fluid heater system according to claim 11, wherein cooled heater fluid is transferred from the first heat exchanger to the heater fluid reservoir.

13. The flameless fluid heater system according to claim 1, wherein the second heat exchanger is located outside the closed heater fluid loop.

14. The flameless fluid heater system according to claim 1, wherein the third heat exchanger is located outside the closed heater fluid loop.

15. The flameless fluid heater system according to claim 1, wherein the fourth heat exchanger is located outside the closed heater fluid loop.

16. The flameless fluid heater system according to claim 1, wherein the third heat exchanger is the intercooler.

17. A method of flamelessly heating a fluid, said method comprising:
    operating an engine to drive a heater fluid pump and a water pump,
    transferring heater fluid in a closed loop including the heater fluid pump, a dynamic heater and a first heat exchanger,
    transferring water in a first route from an outlet of the water pump to the first heat exchanger where the water is heated by the heater fluid and then the water is transferred to an inlet of the water pump, and
    transferring water in a second route from the outlet of the water pump to a second heat exchanger where the water is heated by air from the engine, to a third heat exchanger where the water is heated by coolant from the engine and to a fourth heat exchanger where the water is heated by exhaust from the engine before the water is returned to the inlet of the water pump,
    wherein the water pump is driven by the engine through a pump shaft driven by an output shaft of the engine,
    wherein the output shaft drives the dynamic heater, and
    wherein the heater fluid is at least one of oil and glycol.

18. The method of flamelessly heating a fluid according to claim 17, wherein the second heat exchanger, the third heat exchanger, and the fourth heat exchanger are arranged outside the closed loop.

19. The method of flamelessly heating a fluid according to claim 17, wherein the second heat exchanger is an intercooler.

20. A flameless fluid heating system comprising:
an internal combustion engine having an engine coolant and gases that flow to and from the engine, and are heated thereby;
a supply source providing a supply fluid in fluid communication with a supply fluid inlet;
a supply fluid outlet in fluid communication with the supply fluid inlet;
a pump having a pump inlet in fluid communication with an inlet pipe and the supply fluid inlet, and a pump outlet in fluid communication with an outlet pipe and the supply fluid outlet, the pump, the inlet and outlet pipes, and the supply fluid inlet and outlet connected together to define a main flow path such that the pump transfers supply fluid along the main flow path from the supply fluid inlet through the inlet and outlet pipes to the supply fluid outlet;
a fluid heat exchanger arrangement in communication with the supply fluid of the supply source and the engine coolant and gases of the engine for receiving the heated engine coolant and the heated gases of the engine; and
a heat generator in fluid communication with a heat transfer fluid reservoir containing a heat transfer fluid for receiving the heat transfer fluid and circulating the heat transfer fluid within the heat generator to create fluid friction therein to directly heat the heat transfer fluid and provide heated transfer fluid,
wherein the fluid heat exchanger arrangement comprises a heat transfer fluid heat exchanger in communication with the heat generator and the supply fluid for receiving the heated transfer fluid from the heat generator,
wherein a first portion of the supply fluid is diverted from the main flow path and the outlet pipe to the fluid heat exchanger arrangement such that heat from the heated engine gases and the heated engine coolant is transferred to the supply fluid to provide a first source of heated supply fluid to the inlet pipe and the main flow path,
wherein a second portion of the supply fluid is diverted from the main flow path and the outlet pipe to the heat transfer fluid heat exchanger such that heat from the heated transfer fluid is transferred to the supply fluid to provide a second source of heated supply fluid to the inlet pipe and the main flow path,
wherein the first and second sources of heated supply fluid are delivered by the pump along the main flow path to the supply fluid outlet,
wherein the heat generator and the heat transfer fluid reservoir are arranged within a closed heater transfer fluid loop, and
wherein the heater transfer fluid is at least one of oil and glycol.

* * * * *